US011712825B2

(12) United States Patent
Selvasekar et al.

(10) Patent No.: US 11,712,825 B2
(45) Date of Patent: Aug. 1, 2023

(54) TRIM ARTICLE HAVING AN INTEGRATED STRUCTURAL COMPOSITION WITH VARIATED DENSITIES AND METHODS FOR MAKING THE SAME

(71) Applicant: Ford Global Technologies, LLC, Dearborn, MI (US)

(72) Inventors: Siddharthan Selvasekar, Livermore, CA (US); Andres Almeida Senatore, San Jose, CA (US); Kevin VanNieulande, Fraser, MI (US); Michael Steven Medoro, Sunnyvale, CA (US); Victoria Leigh Schein, Dearborn, MI (US); Patrick Maloney, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 724 days.

(21) Appl. No.: 16/565,825

(22) Filed: Sep. 10, 2019

(65) Prior Publication Data

US 2021/0069948 A1 Mar. 11, 2021

(51) Int. Cl.
*B60N 2/56* (2006.01)
*B60N 2/64* (2006.01)
*B29C 44/34* (2006.01)
*B60N 99/00* (2006.01)
*B60N 2/70* (2006.01)
(Continued)

(52) U.S. Cl.
CPC .......... *B29C 44/356* (2013.01); *B29C 64/194* (2017.08); *B60N 2/7017* (2013.01); *B60N 99/00* (2013.01); *B33Y 10/00* (2014.12); *B60N 2205/30* (2013.01)

(58) Field of Classification Search
CPC ...... B33Y 80/00; B33Y 10/00; B60N 2/7017; B60N 2/5642; B60N 2/64
See application file for complete search history.

(56) References Cited

U.S. PATENT DOCUMENTS 5,405,178 A * 4/1995 Weingartner ............ B60N 2/58
297/DIG. 5
7,707,743 B2 * 5/2010 Schindler ............. A43B 7/1445
36/27
(Continued)

FOREIGN PATENT DOCUMENTS

DE 102013218223 A1 2/2015
DE 102016225837 A1 6/2018
(Continued)

*Primary Examiner* — Shin H Kim
(74) *Attorney, Agent, or Firm* — Vichit Chea; Price Heneveld LLP

(57) ABSTRACT

A trim article includes an outer casing having an inner surface defining an interior portion of the outer casing. The outer casing includes a front surface having a plurality of through apertures disposed thereon. A core portion is disposed within the interior portion of the outer casing and includes first and second portions having variated densities relative to one another. The first and second portions include lattice matrices having variated patterns of interconnected links and associated cells that provide variated force deflection parameters between the first and second portions of the core portion. The outer casing and the core portion are integrated to define a monolithic structure comprised of a common material.

20 Claims, 6 Drawing Sheets

(51) Int. Cl.
*B29C 64/194* (2017.01)
*B33Y 10/00* (2015.01)

(56) References Cited

U.S. PATENT DOCUMENTS

| | | | | |
|---|---|---|---|---|
| 8,657,383 | B2* | 2/2014 | Galbreath | B60N 2/70 297/DIG. 2 |
| 8,662,560 | B2* | 3/2014 | Galbreath | B60N 2/015 296/63 |
| 8,882,202 | B2* | 11/2014 | Petzel | B29C 65/70 297/452.37 |
| 9,168,854 | B2* | 10/2015 | Ursino | B60N 2/7094 |
| 9,456,702 | B2* | 10/2016 | Miyata | A47C 27/14 |
| 10,343,565 | B2* | 7/2019 | Baek | B60N 2/56 |
| 10,357,955 | B2* | 7/2019 | Ziolek | B29C 64/171 |
| 10,398,236 | B2* | 9/2019 | Achten | B29C 64/106 |
| 10,501,598 | B2* | 12/2019 | Baldwin | C08J 9/35 |
| 10,744,914 | B2* | 8/2020 | Baek | B60N 2/5642 |
| 10,750,820 | B2* | 8/2020 | Guyan | A43B 13/16 |
| 10,953,775 | B1* | 3/2021 | Maloney | B60N 2/5642 |
| 11,279,274 | B1* | 3/2022 | Selvasekar | B60N 2/809 |
| 11,299,079 | B1* | 4/2022 | Skrbis | B60N 2/5628 |
| 2005/0066423 | A1* | 3/2005 | Hogan | A41D 1/084 2/227 |
| 2010/0133891 | A1* | 6/2010 | Onoda | B60N 2/7017 297/452.48 |
| 2010/0181796 | A1* | 7/2010 | Galbreath | B60N 2/72 296/63 |
| 2012/0181841 | A1* | 7/2012 | Petzel | B60N 2/90 297/452.48 |
| 2014/0029900 | A1* | 1/2014 | Logan, Jr. | G02B 6/3821 29/874 |
| 2015/0321434 | A1* | 11/2015 | Sterman | B29C 64/118 264/255 |
| 2016/0051009 | A1* | 2/2016 | Kormann | A43B 13/10 36/103 |
| 2016/0075290 | A1* | 3/2016 | Catlin | B05D 7/14 427/407.1 |
| 2016/0096318 | A1* | 4/2016 | Bickel | B33Y 30/00 425/150 |
| 2016/0200051 | A1* | 7/2016 | Urbanic | B29C 64/393 264/308 |
| 2016/0318255 | A1* | 11/2016 | Ou | G05B 19/4099 |
| 2017/0184108 | A1* | 6/2017 | Scancarello | B33Y 10/00 |
| 2017/0332733 | A1* | 11/2017 | Cluckers | A43B 7/28 |
| 2018/0070736 | A1* | 3/2018 | Achten | A47C 27/14 |
| 2019/0299290 | A1* | 10/2019 | Kuhns | B22F 7/002 |
| 2019/0357695 | A1* | 11/2019 | Achten | B33Y 10/00 |
| 2020/0325951 | A1* | 10/2020 | Achten | F16F 3/023 |
| 2021/0024155 | A1* | 1/2021 | Primeaux | B62J 1/26 |
| 2021/0237634 | A1* | 8/2021 | Maloney | B60N 2/66 |

FOREIGN PATENT DOCUMENTS

| | | |
|---|---|---|
| DE | 102018119660 A1 | 2/2019 |
| WO | 2015171856 A1 | 11/2015 |
| WO | 2017093264 A1 | 6/2017 |
| WO | 2017222480 A1 | 12/2017 |
| WO | 2018097694 A1 | 5/2018 |
| WO | 2019017834 A1 | 1/2019 |

* cited by examiner

TRIM ARTICLE HAVING AN INTEGRATED STRUCTURAL COMPOSITION WITH VARIATED DENSITIES AND METHODS FOR MAKING THE SAME

FIELD OF THE INVENTION

The present invention generally relates to a trim article, and more particularly, to a trim article having an integrated structural composition formed using an additive manufacturing technique that is tuned to provide variated densities.

BACKGROUND OF THE INVENTION

Component parts of a vehicle are generally comprised of multiple material substrates, which require unique formulations of the various materials to obtain different density profiles within the component. Single material component parts configured using an additive manufacturing technique are desired to provide variated density profiles within the component part.

SUMMARY OF THE INVENTION

According to one aspect of the present invention, a trim article includes an outer casing having a first side and a second side with an interior portion disposed therebetween. A first lattice matrix is disposed within the interior portion of the outer casing and includes a first pattern of interconnected links defining a first set of cells of the first lattice matrix. A second lattice matrix is disposed within the interior portion of the outer casing and includes a first pattern of interconnected links defining a first set of cells of the second lattice matrix. The second lattice matrix includes an overall density profile that is greater than an overall density profile of the first lattice matrix.

According to another aspect of the present invention, a trim article includes a first lattice matrix including first and second sides. The first lattice matrix includes a first pattern of interconnected links defining a plurality of cells. A second lattice matrix includes first and second sides and further includes a second pattern of interconnected links defining a plurality of cells. The first side of the second lattice matrix is operably coupled to the second side of the first lattice matrix. The first lattice matrix includes an overall density profile that is less than an overall density profile of the second lattice matrix.

According to yet another aspect of the present invention, a trim article includes an outer casing having an inner surface defining an interior portion of the outer casing. The outer casing further includes a front surface having a plurality of through apertures disposed thereon. A core portion is disposed within the interior portion of the outer casing. The core portion includes first and second portions having variated densities relative to one another. The outer casing and the core portion are integrated to define a monolithic structure comprised of a common material.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
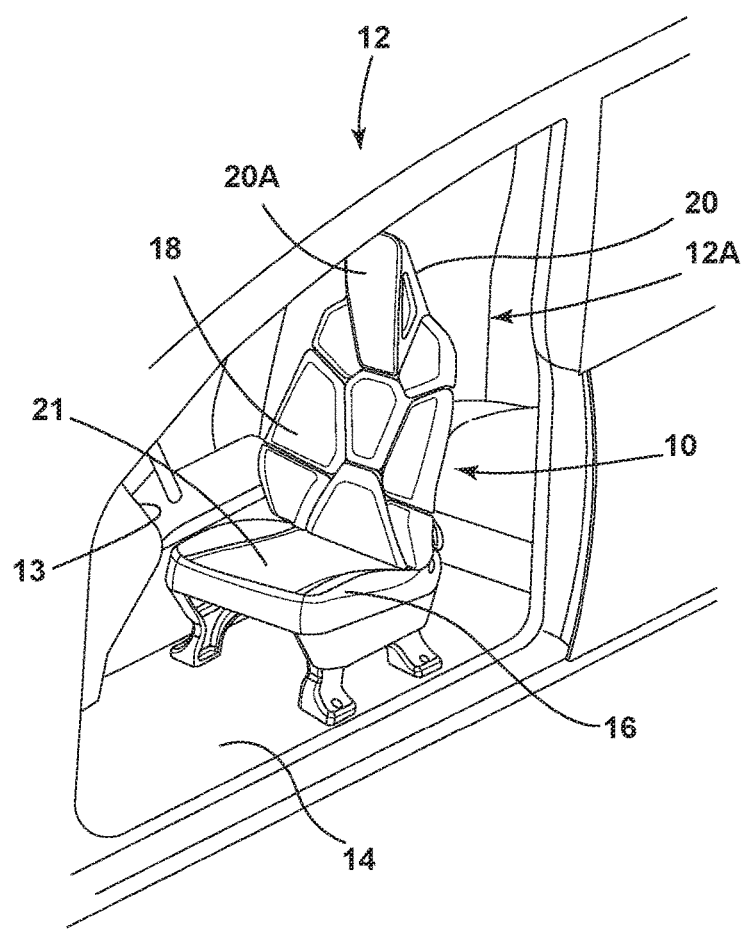
FIG. 1 is a front perspective view of a seat assembly positioned within a vehicle interior and having a plurality of trim articles disposed thereon.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a seat assembly 10 is shown disposed within an interior 12A of a vehicle 12. Specifically, the seat assembly 10 is disposed within the vehicle interior 12A adjacent to an instrument panel or dashboard 13. In FIG. 1, the seat assembly 10 is positioned in a driver's side seating area. However, it is contemplated that the seat assembly 10, or various components and features thereof, can be disposed on other seat assemblies positioned in other areas of a vehicle interior 12A, such as the passenger side seating area, a rear seating area, or a third row seating option for example. The seat assembly 10 is shown in FIG. 1 as being supported on a vehicle floor support surface 14 and generally includes a substantially horizontal seat portion 16 and a substantially upright seatback 18. It is contemplated that the seat assembly 10 may be configured to rotate within the vehicle interior 12A between forward-facing and rearward-facing configurations. As such, it is contemplated that the vehicle 12 may be an autonomous or self-driving vehicle, in which a seat assembly having forward-facing and rearward-facing capabilities could be used.

Figure 2:
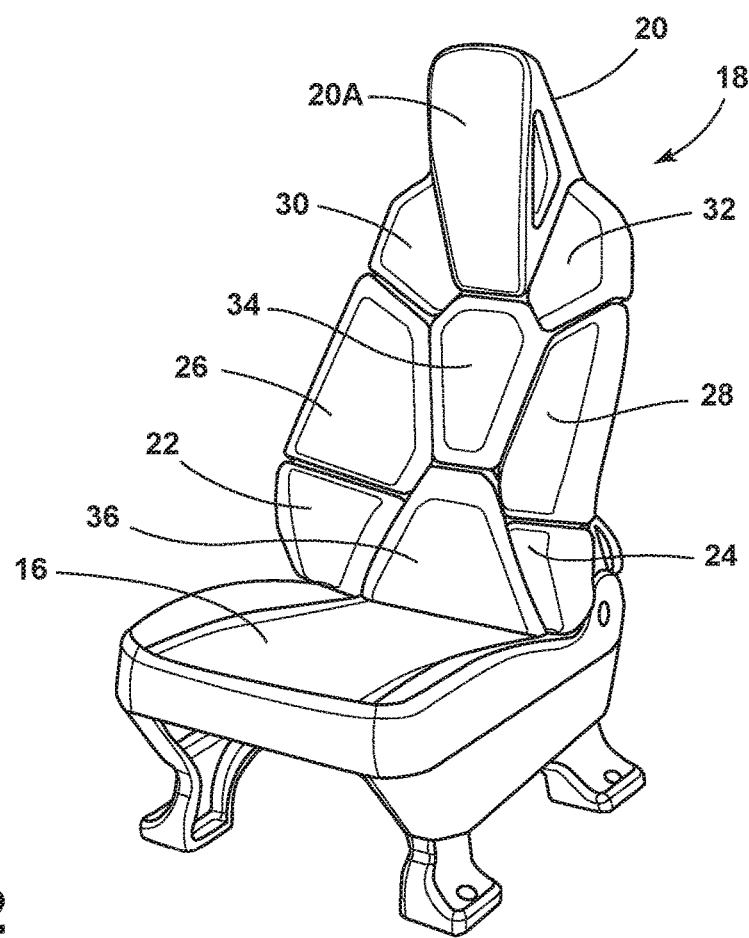
FIG. 2 is a front perspective view of the seat assembly of FIG. 1 as removed from the vehicle interior.

As shown in FIGS. 1 and 2, a headrest assembly 20 is disposed on an upper portion of the seatback 18 and includes a forwardly extending headrest bun 20A. The headrest assembly 20 and the seatback 18 may be integrated components or modular components coupled to one another. As further shown in FIG. 1, the seat portion 16 includes an upper support surface 21 configured to support a seat occupant thereon.

With specific reference to FIG. 2, generally the seat portion 16, the seatback 18 and the headrest assembly 20 would include various support materials, such as cloth/leather/vinyl covering materials and foam/plastic support materials, packaged on exterior comfort carrier modules, to support a seat occupant seated on the seat assembly 10. The seat assembly 10 of the present concept is configured to provide these support features using an integrated component structure as further described below.

As further shown in FIG. 2, the seatback 18 includes a plurality of trim articles which cooperate to provide a support structure for the seatback 18. As specifically shown in FIG. 2, the trim articles are identified as reference numerals 22-36, wherein trim articles 22, 24, 26 and 28 define support for opposing side bolsters of the seatback 18. The trim articles 30, 32 define an upper support portion for the seatback 18, and the trim articles 34, 36 define a generally centrally disposed back support portion of the seatback 18. Together, the trim articles 22-36 provide independent support features which cooperate to support and properly position a seat occupant.

The trim articles discussed herein are contemplated to be comprised of a single material used in an additive manufacturing process to form the individual trim articles into monolithic structures. In this way, the trim articles of the present concept include fully integrated features comprised of a common material that define overall monolithic structures. As used herein, the term "integrated" refers to component parts of a unitary whole that are formed together to provide the monolithic structure of the overall article. As used herein, the term "monolithic structure" is used to describe a structure that is formed of a single or common material provided in a forming process, such as an additive manufacturing technique. Additive manufacturing techniques contemplated for use with the present concept may include 3D printing, laser sintering and other known additive manufacturing techniques. Further, the trim articles of the present concept are not only monolithic in structure, but are specifically configured to provide variated density profiles within a monolithic structure. As used herein, the term "density profile" is used to describe a relative hardness of a component part of a trim article relative to another like component part. Thus, the trim articles of the present concept include density profiles for a variety of specific component parts, which cooperate to provide an overall density profile for the overall trim article, as further described below. A density profile takes into account a degree of deflection of a part under a given force and can be expressed as a softness, or more likely, a hardness of the part.

Figure 3:
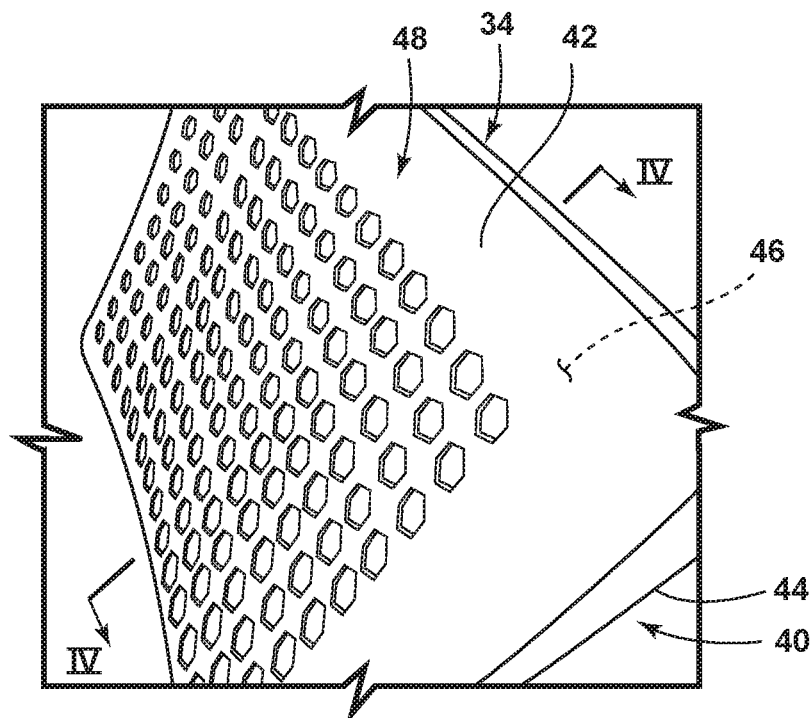
FIG. 3 is a top perspective view of a trim article of the seat assembly of FIG. 2.

Referring now to FIG. 3, the trim article 34 is shown having an outer casing 40 which includes first and second sides 42, 44. The first and second sides 42, 44 are spaced-apart from one another to define an interior portion 46 disposed therebetween. The first and second sides 42, 44 of the outer casing 40 may define front and rear surfaces of the outer casing 40, respectively. As such, the first and second sides 42, 44 may further define front and rear surfaces of the overall trim article 34. As further shown in FIG. 3, the first side 42 includes a plurality of through apertures 48 which open into the interior portion 46 of the outer casing 40.

Figure 4:
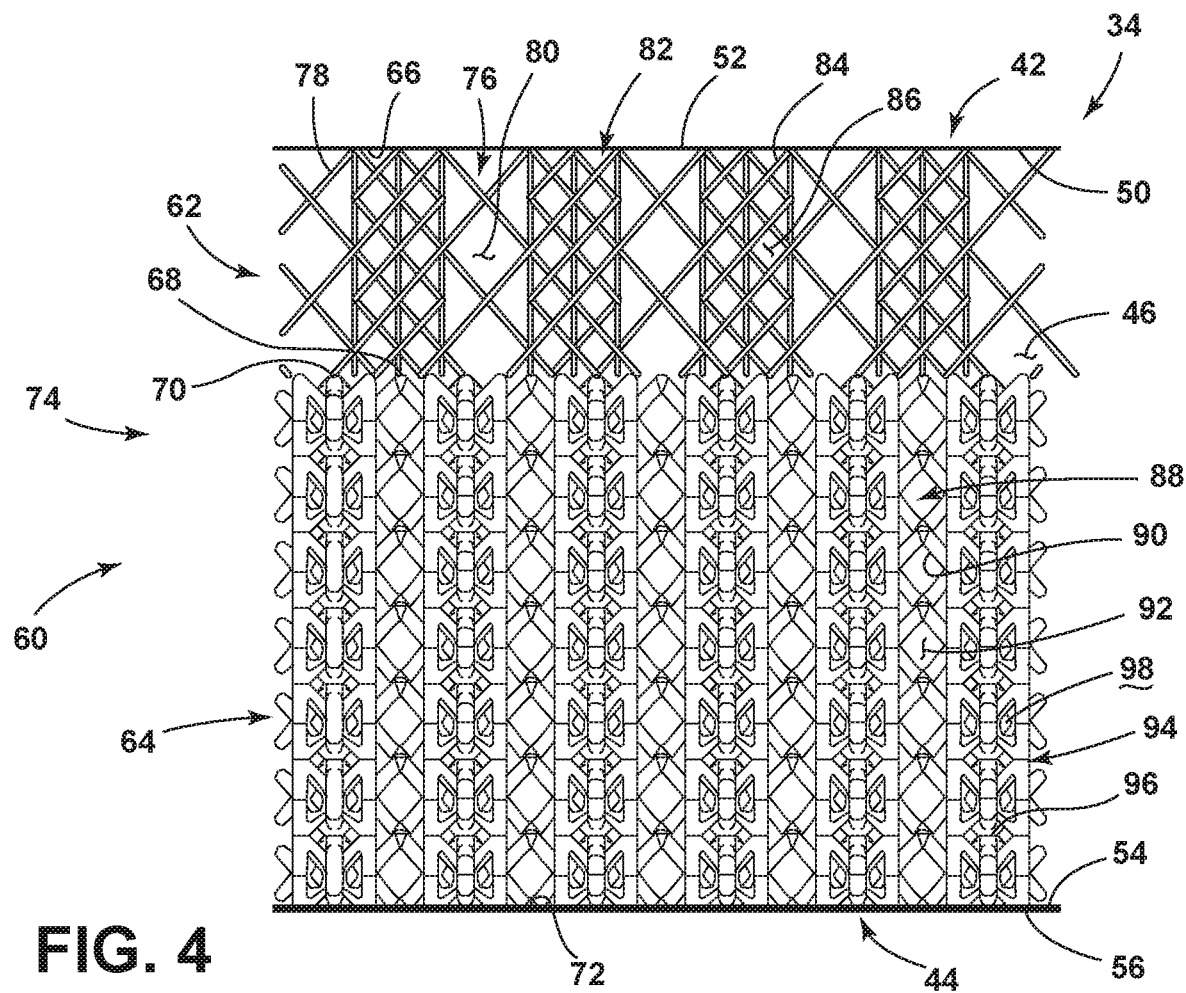
FIG. 4 is a cross-sectional view of the trim article of FIG. 3 taken at line IV showing multiple lattice matrices disposed within an interior portion of the trim article as defined by an outer casing.

Referring now to FIG. 4, a cross-sectional view of the trim article 34 is shown with the first and second sides 42, 44 of the outer casing 40 shown in the spaced-apart configuration described above to define the interior portion 46 therebetween. The first side 42 of the outer casing 40 includes an inner surface 50 and an outer surface 52. The second side 44 of the outer casing 40 includes an inner surface 54 and an outer surface 56. With reference to FIG. 3, the outer casing 40 is shown as a continuous outer casing surrounding the interior portion 46. As such, the inner surface 50 of the first side 42 of the outer casing 40 and the inner surface 54 of the second side 44 of the outer casing 40 cooperate to define a continuous inner surface that defines parameters of the interior portion 46.

As further shown in FIG. 4, the trim article 34 includes a core portion 60 disposed within the interior portion 46. The core portion 60 includes a first lattice matrix 62 and a second lattice matrix 64 disposed within the interior portion 46. As used herein, the term "lattice matrix" refers to a structural pattern of interconnected links that define cells or voids therebetween, wherein the overall pattern resembles an expanded material configuration. The first lattice matrix 62 includes a first side 66 and a second side 68. The first side 66 of the first lattice matrix 62 is operably coupled to the inner surface 50 of the first side 42 of the outer casing 40. As further shown in FIG. 4, the second lattice matrix 64 includes a first side 70 and a second side 72, wherein the first side 70 of the second lattice matrix 64 is operably coupled to the second side 68 of the first lattice matrix 62. The second side 72 of the second lattice matrix 64 is operably coupled to the inner surface 54 of the second side 44 of the outer casing 40. Thus, the first and second sides 42, 44 of the outer casing 40 and the first and second lattice matrices 62, 64 are operably coupled to one another to form an integrated whole. As such, the trim article 34 defines a monolithic structure 74 which may be formed by an additive manufacturing technique using a common material to integrally form the trim article 34, as further described below.

As further shown in FIG. 4, the first lattice matrix 62 includes a first pattern 76 of interconnected links 78, wherein the interconnected links 78 cooperate to define a first set of cells 80. In the embodiment shown in FIG. 4, the first pattern 76 of interconnected links 78 is shown in a general crisscrossing lattice configuration to provide substantially diamond-shaped cells 80. Other patterns for the first lattice matrix 62 are also contemplated for use with the present concept, which may result in cells of a different shape than the cells 80 shown in FIG. 4. The cells 80 generally define voids within the first lattice matrix 62 at the first pattern 76 of interconnected links 78. The cells 80 are contemplated to extend through the first lattice matrix 62 and are generally configured to terminate at abutting interconnections with the outer casing 40. As further shown in FIG. 4, the first lattice matrix 62 includes a second pattern 82 of interconnected links 84, wherein the interconnected links 84 cooperate to define a second set of cells 86. Much like the first pattern 76, other patterns for the second pattern 82 of the first lattice matrix 62 are also contemplated for use with the present concept. The cells 86 are smaller than the cells 80, such that the second pattern 82 of interconnected links 84 defines a tighter knit pattern as compared to the first pattern 76 of interconnected links 78. In this way, the first pattern 76 of interconnected links 78 is contemplated to have a density profile that is less than a density profile of the second pattern 82 of interconnected links 84. Together, the density profile of the first pattern 76 of interconnected links 78 and the density profile of the second pattern 82 of interconnected links 84 cooperate to define an overall density profile for the first lattice matrix 62. Thus, as shown in FIG. 4, the first set of cells 80 are larger than the second set of cells 86, such that the individual cells of the first set of cells 80 have a size that is greater than a size of the individual cells of the second set of cells 86.

The interconnected links 78 and 84 of the first and second patterns 76, 82 may be comprised of a common material that is flexibly resilient. In this way, the interconnected links 78 and 84 of the first and second patterns 76, 82 can deform or deflect into adjacent cells of the first and second sets of cells 80, 86 under an applied force. As such, larger cells can provide more room for deflection of the links to reduce the hardness of a pattern of interconnected links. Thus, the first lattice matrix 62 includes an overall density profile that is defined by the density profiles of the first and second patterns 76, 82 of interconnected links 78, 84. The stiffness and thickness of the interconnected links 78, 84 may also vary to alter the density profiles of a given matrix, as further described below.

As further shown in FIG. 4, the second lattice matrix 64 includes a first pattern 88 of interconnected links 90, wherein the interconnected links 90 cooperate to define a first set of cells 92. In the embodiment shown in FIG. 4, the first pattern 88 of interconnected links 90 is shown in a general crisscrossing lattice configuration to provide substantially diamond-shaped cells 92. Other patterns for the second lattice matrix 64 are also contemplated for use with the present concept. The cells 92, generally define voids within the second lattice matrix 64 at the first pattern 88 of interconnected links 90. The cells 92 are contemplated to extend through the second lattice matrix 64 and are generally configured to terminate at abutting interconnections with the outer casing 40.

As further shown in FIG. 4, the second lattice matrix 64 also includes a second pattern 94 of interconnected links 96, wherein the second pattern 94 of interconnected links 96 cooperate to define a second set of cells 98. Much like the first pattern 88, other patterns for the second pattern 94 of the second lattice matrix 64 are also contemplated for use with the present concept. The cells 98 are smaller than the cells 92, such that the second pattern 94 of interconnected links 96 defines a tighter knit pattern as compared to the first pattern 88 of interconnected links 90 within the second lattice matrix 64. In this way, the first pattern 88 of interconnected links 90 of the second lattice matrix 64 is contemplated to have a density profile that is less than a density profile of the second pattern 94 of interconnected links 96. Together, the density profile of the first pattern 88 of interconnected links 90 and the density profile of the second pattern 94 of interconnected links 96 of the second lattice matrix 64 cooperate to define an overall density profile for the second lattice matrix 64 that is greater than the overall density profile of the first lattice matrix 62.

With specific reference to the second lattice matrix 64 shown in FIG. 4, the interconnected links 90, 96 of the first and second patterns 88, 94 may be comprised of a common material that is flexibly resilient. In this way, the interconnected links 90, 96 of the first and second patterns 88, 94 of the second lattice matrix 64 can deform or deflect into adjacent cells of the first and second sets of cells 92, 98 under an applied force. As such, larger cells can provide more room for deflection of the links to reduce the hardness of a pattern of interconnected links. Thus, the second lattice matrix 64 includes an overall density profile that is defined by the density profiles of the first and second patterns 88, 94 of interconnected links 90, 96. As further shown in FIG. 4, the links 90, 96 of the second lattice matrix 64 are larger or thicker than the links 78, 84 of the first lattice matrix 62. As such, the interconnected links 78, 84 of the first lattice matrix 62 include a thickness that is less than a thickness of the interconnected links 90, 96 of the second lattice matrix 64. With the first and second lattice matrices 62, 64 being comprised of a common material, the overall density profile of the second lattice matrix 64 is greater than the overall density profile of the first lattice matrix 62, and vice versa. This greater density profile of the second lattice matrix 64 is largely due to the increased thickness of the links 90, 96 as compared to the links 78, 84, which provide for a stiffer more dense profile. The greater density profile of the second lattice matrix 64 as compared to the first lattice matrix 62 is further due to the decreased size of the cells 92, 98 as compared to the cells 80, 86 of the first lattice matrix 62.

With further reference to FIG. 4, the first and second patterns 76, 82 of the first lattice matrix 62 are configured within the first lattice matrix 62 as alternating columns throughout the entirety of the first lattice matrix 62. It is contemplated that other configurations for the first and second patterns 76, 82 may be provided within the first lattice matrix 62 in order to alter the overall density profile of the first lattice matrix 62. Similarly, the first and second patterns 88, 94 of the second lattice matrix 64 are shown in an alternating configuration throughout the entirety of the second lattice matrix 64. Again, other configurations of the first and second patterns 88, 94 may be provided within the second lattice matrix 64 to variate an overall density profile across the second lattice matrix 64.

Figure 5:
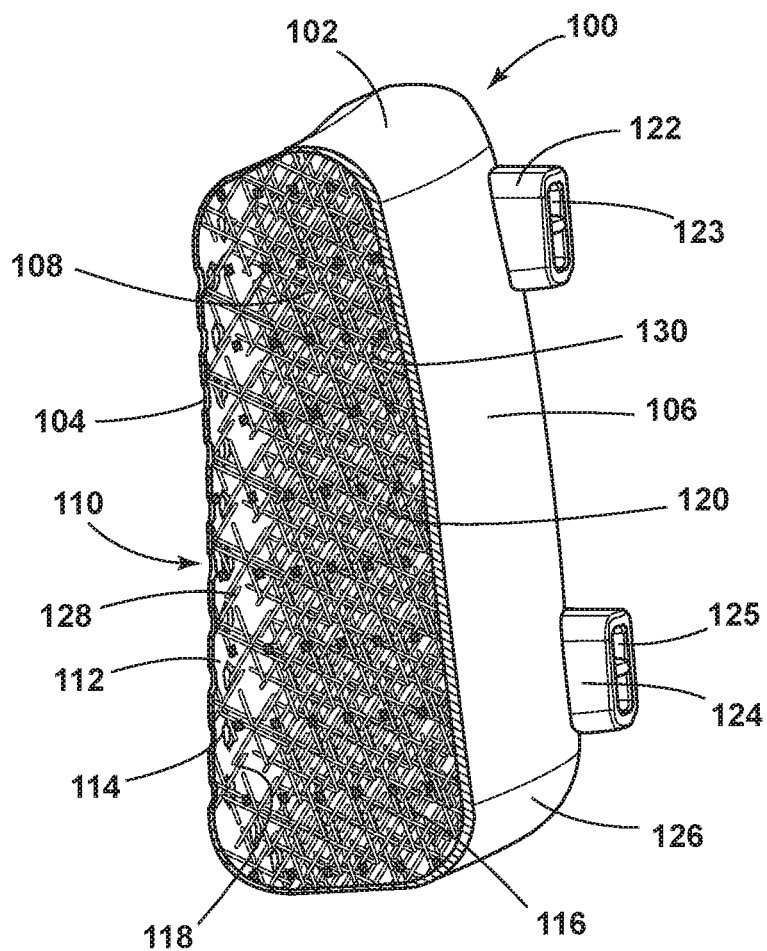
FIG. 5 is a cross-sectional view of a trim article according to another embodiment showing multiple lattice matrices disposed within an interior portion of the trim article as defined by an outer casing.

Referring now to FIG. 5, a trim article 100 is shown in the form of a headrest assembly that is contemplated to be comprised of a common material used to create the individual components of the trim article 100 by using an additive manufacturing technique. As specifically shown in FIG. 5, the trim article 100 includes an outer casing 102 having first and second sides 104, 106 which are spaced-apart from one another to define an interior portion 108 therebetween. As shown in FIG. 5, the first side 104 of the outer casing 102 includes a plurality of through apertures 110, such that the trim article 100 includes a front surface 112 having the through apertures 110 disposed therethrough. The outer casing 102 further includes an inner surface 114, which is disposed within an entirety of the outer casing 102 to define the contours of the interior portion 108. It is contemplated that the outer casing 102 may have variated thicknesses along discrete portions thereof for providing different attributes in the comfort and feel of the overall trim article 100 at specific locations.

With further reference to FIG. 5, the trim article 100 includes a core portion 116 disposed within the interior portion 108 of the outer casing 102. The core portion 116 includes first and second portions 118, 120, which include variated densities relative to one another. It is contemplated that the outer casing 102 and the first and second portions 118, 120 of the core portion 116 are comprised of a common material formed in an additive manufacturing process to define an overall monolithic structure. As further shown in FIG. 5, the trim article 100 includes upper and lower attachment features 122, 124 which rearwardly extend from the second side 106 of the trim article 100. In assembly, the upper and lower attachment features 122, 124 may provide mounting locations for mounting the trim article 100 to an adjacent structure. As such, the upper and lower attachment features 122, 124 are structural members that are contemplated to be rigid features having attachment locations, such as respective mounting apertures 123, 125. The upper and lower attachment features 122, 124 are integrally formed with the outer casing 102 at an outer surface 126 disposed on the second side 106 of the outer casing 102. As noted above, the trim article 100 is contemplated to be comprised of a common material formed in an additive manufacturing process, such that the outer casing 102, the core portion 116 and the upper and lower attachment features 122, 124 are all contemplated to be integrally formed to define an overall monolithic structure of the trim article 100.

With further reference to FIG. 5, the first and second portions 118, 120 of the core portion 116 include first and second lattice matrices 128, 130 that are contemplated to be integrally formed with one another along with the outer casing 102 and the upper and lower attachment features 122, 124. The first and second lattice matrices 128, 130 are contemplated to have variated density profiles relative to one another in a similar manner as described with regards to the lattice matrices 62, 64 of trim article 34.

Figure 6:
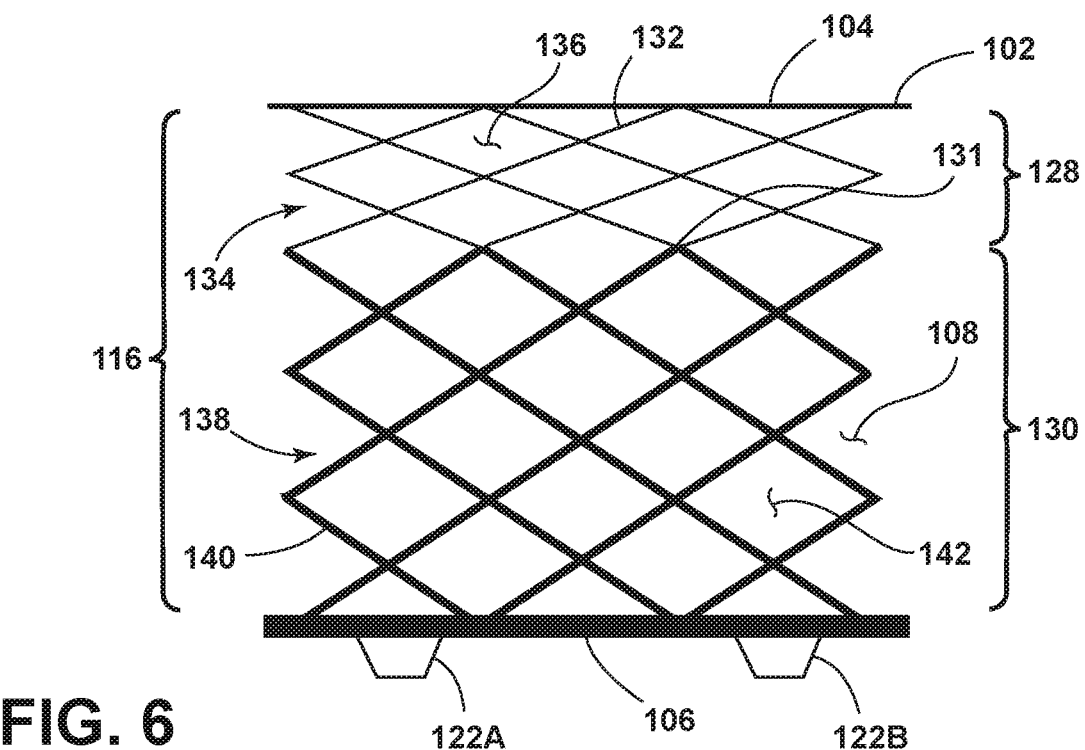
FIG. 6 is a cross-sectional view of the trim article of FIG. 5 showing the multiple lattice matrices interconnected with one another and the outer casing.

Referring now to FIG. 6, a cross-sectional view of the trim article 100 is shown, wherein the first and second sides 104, 106 of the outer casing 102 are shown spaced-apart from one another to define the interior portion 108 in which the core portion 116 is disposed. As noted above, the core portion 116 is comprised of the first and second lattice matrices 128, 130 defined within first and second portions 118, 120 of the core portion 116, respectively, such that the first lattice matrix 128 may be considered a soft covering portion of the core portion 116 relative to the second lattice matrix 130. The second lattice matrix 130 may be considered a more rigid support layer of the core portion 116 which is covered by the softer comfort layer of the first lattice matrix 128 at an outer surface 131 of the second lattice matrix 130. In the embodiment shown in FIG. 6, the first side 104 of the outer casing 102 includes a thickness that is less than a thickness of the second side 106 of the outer casing 102. With the first and second sides 104, 106 of the outer casing 102 being comprised of a common material, and having varied thicknesses relative to one another, it is contemplated that the thinner first side 104 of the outer casing 102 is a softer, more flexible side of the outer casing 102 as compared to the thicker second side 106. The second side 106 is contemplated to be a more rigid side of the outer casing 102 to support the attachment features 122, 124 for securely mounting the trim article 100 to an adjacent component. In FIG. 6, dual upper attachment features 122A, 122B are shown as spaced-apart on the second side 106 of the outer casing 102 in order to provide parallel attachment locations for the trim article 100.

As further shown in FIG. 6, the first lattice matrix 128 includes a plurality of interconnected links 132 to define a first pattern 134 of interconnected links 132. The interconnected links 132 cooperate within the first pattern 134 to define a first set of cells 136. In the embodiment shown in FIG. 6, the first pattern 134 of interconnected links 132 is shown in a general crisscrossing lattice configuration to provide substantially diamond-shaped cells 136. Other patterns for the first lattice matrix 128 are also contemplated for use with the present concept, which may result in cells of a different shape than the cells 136 shown in FIG. 6. The first set of cells 136 generally define voids within the first lattice matrix 128 at the first pattern 134 of interconnected links 132. The cells 136 are contemplated to extend through the first lattice matrix 128 and are generally configured to terminate at abutting interconnections with the outer casing 102.

As further shown in FIG. 6, the second lattice matrix 130 includes a second pattern 138 of a plurality of interconnected links 140. The interconnected links 140 cooperate to define a second set of cells 142. In the embodiment shown in FIG. 6, the second pattern 138 of interconnected links 140 is shown in a general crisscrossing lattice configuration to provide substantially diamond-shaped cells 142. Other patterns for the second lattice matrix 130 are also contemplated for use with the present concept. The cells 142, generally define voids within the second lattice matrix 130 at the second pattern 138 of interconnected links 140. The cells 142 are contemplated to extend through the second lattice matrix 130 and are generally configured to terminate at abutting interconnections with the outer casing 102. The individual cells of the second set of cells 142 of the second lattice matrix 130 include a size that is smaller than a size of the individual cells of the first set of cells 136 of the first lattice matrix 128, and vice versa. Thus, the second pattern 138 of interconnected links 140 of the second lattice matrix 130 defines a tighter knit pattern as compared to the first pattern 134 of interconnected links 132 of the first lattice matrix 128. In this way, the second pattern 138 of interconnected links 140 of the second lattice matrix 130 that makes up the second portion 120 of the core portion 116 is contemplated to have a density profile that is greater than a density profile of the first pattern 134 of interconnected links 132 of the first lattice matrix 128 that makes up the first portion 118 of the core portion 116. As further shown in FIG. 6, the first set of cells 136 are larger than the second set of cells 142, such that the individual cells of the first set of cells 136 have a size that is greater than a size of the individual cells of the second set of cells 142.

As further shown in FIG. 6, the links 132, 140 of the first and second lattice matrices 128, 130, respectively, are varied in thickness. Specifically, the links 132 of the first lattice matrix 128 include a thickness that is less than a thickness of the links 140 of the second lattice matrix 130. Said differently, the links 140 of the second lattice matrix 130 are larger or thicker than the links 132 of the first lattice matrix 128. With the first and second lattice matrices 128, 130 being comprised of a common material, the overall density profile of the second lattice matrix 130 is greater than the overall density profile of the first lattice matrix 128, and vice versa. This greater density profile of the second lattice matrix 130 is largely due to the increased thickness of the links 140 as compared to the links 132 of the first lattice matrix 128, which provide for a stiffer more dense profile. The greater density profile of the second lattice matrix 130 as compared to the first lattice matrix 128 is further due to the decreased size of the cells 142 of the second lattice matrix 130 as compared to the larger cells 136 of the first lattice matrix 128. As the first and second portions 118, 120 of the core portion 116 include respective lattice matrices 128, 130 having variated patterns of interconnected links (132, 140) and associated cells (136, 142) of variated size, the first and second portions 118, 120 of the core portion 116 include variated force deflection parameters relative to one another.

Figure 7:
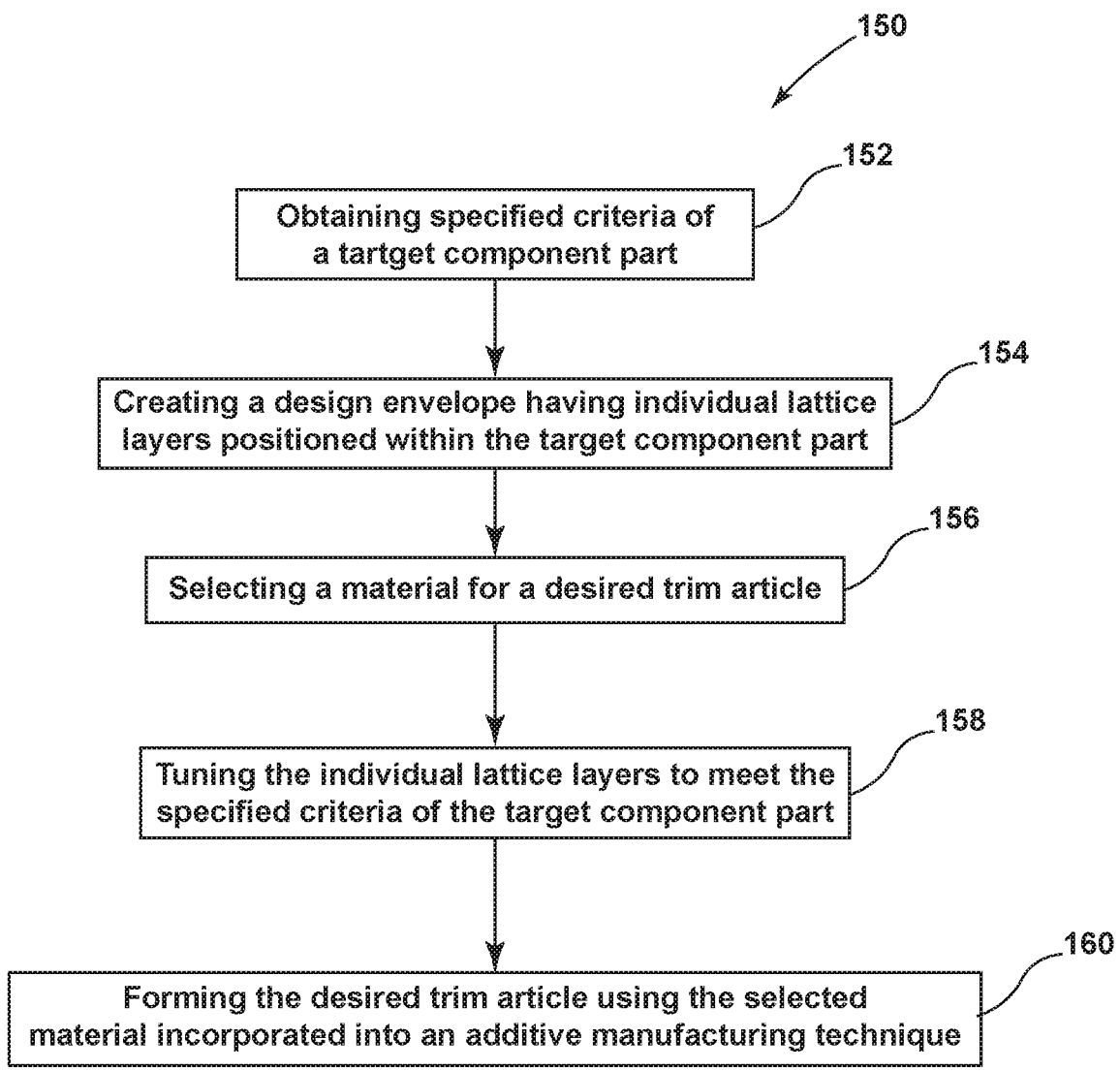
FIG. 7 is a flow chart representing a method of producing a trim article according to an embodiment.
Figure 8:
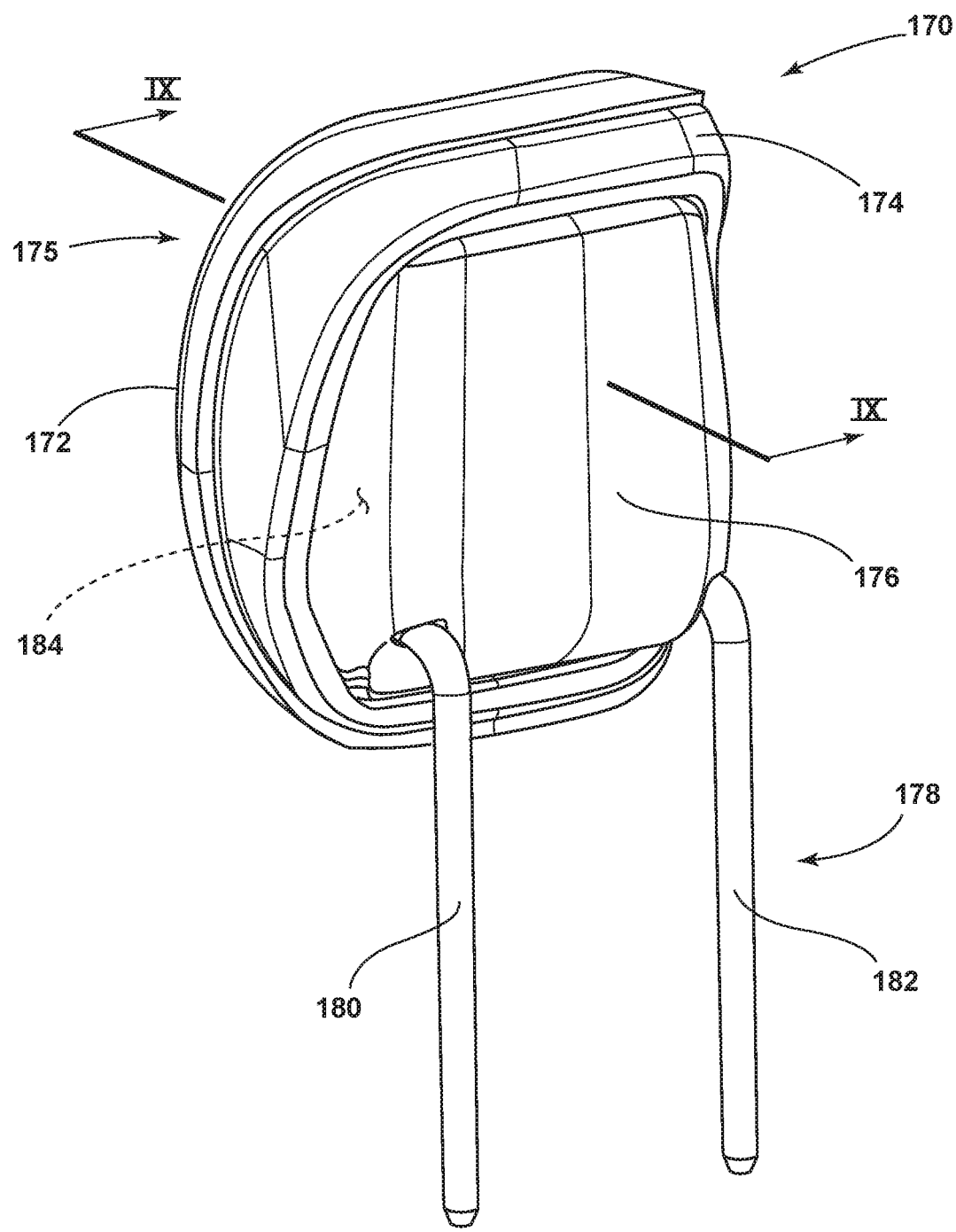
FIG. 8 is a rear perspective view of a target component part in the form of a headrest assembly.
Figure 9:
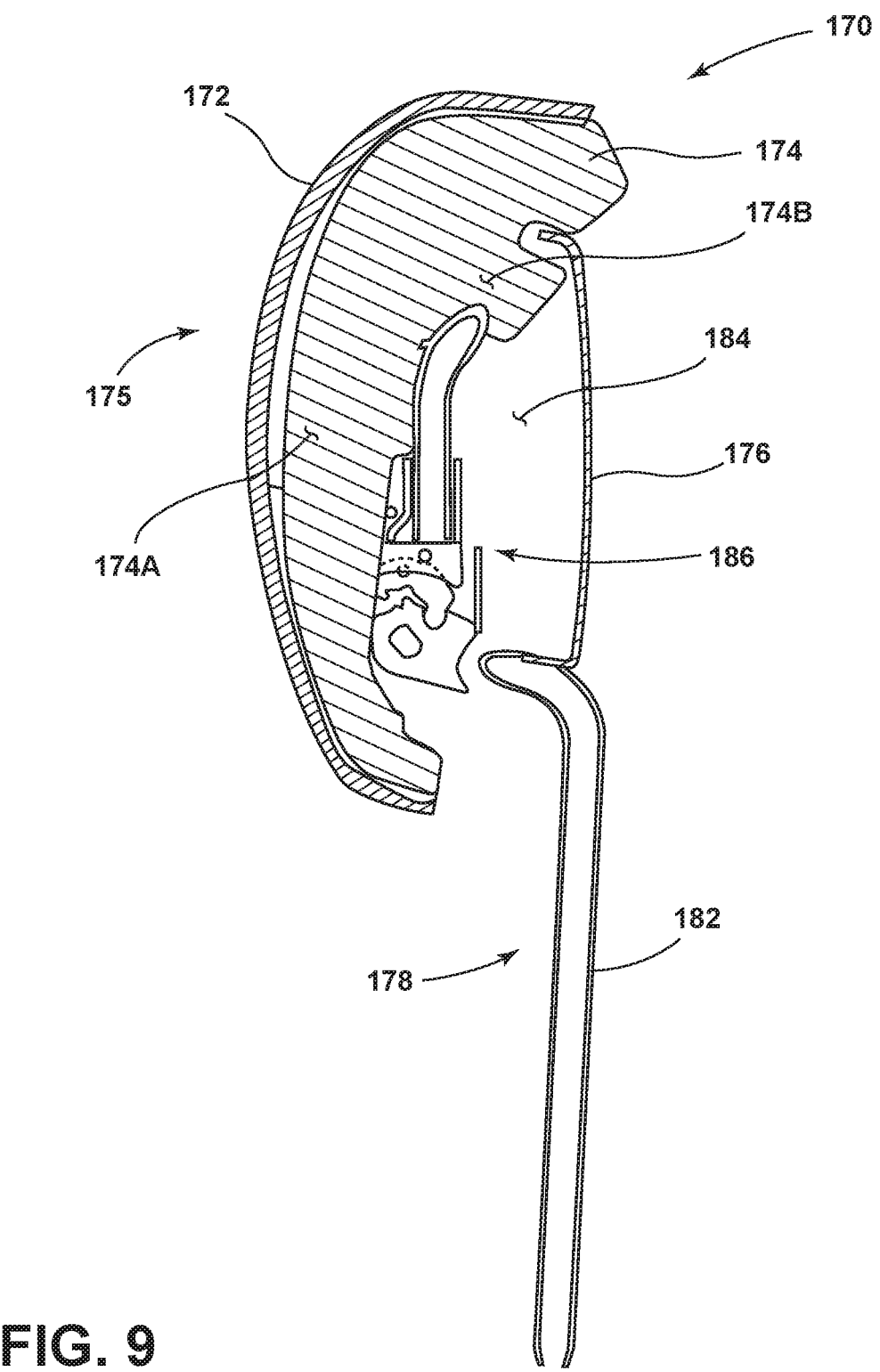
FIG. 9 is a cross-sectional view of the target component part of FIG. 8 taken at line IX.

Referring now to FIG. 7, a method 150 is shown illustrating relevant steps involved in making a trim article of the present concept. In a first step 152, specified criteria of a relevant component part is obtained. The specified criteria may be retrieved from a database where the specified criteria of multiple component parts is housed. As used in relation to the method 150 of the present concept, the term "relevant component part" or "target component part" refers to a known part that is produced using a plurality of materials (such as plastic, foam, metal, leather, vinyl, etc.) that are configured into plurality of individual structures (such as padding, skins, support posts and attachment brackets, etc.) that are assembled together to create a cohesive, but not a monolithic whole, as shown in FIGS. 8 and 9. In this way, a trim article produced using the method 150 of the present concept will be configured to have similar functionality as the target component part which it is contemplated to emulate. As noted above, the present concept is contemplated to provide a trim article created as a monolithic whole using a single material for producing the trim article by incorporating an additive manufacturing technique. For example, the specified criteria may involve a headrest assembly that has a similar configuration to the trim article 100 shown in FIGS. 5 and 6. Such a relevant component part is known in the art and includes multiple materials and structures assembled together to provide the overall component part. Such structures may generally include an outer casing that will typically have a soft and flexibly resilient feel as disposed over a core portion in which one or more foam and structural components are disposed. The outer casing of a common headrest will generally include a leather, suede or vinyl material that is stretched over a padding material. As such, the specified criteria of the relevant component part may include parameters for an outer casing and core portion of a trim article to be produced. These parameters may include performance criteria such as force deflection and associated density profiles. It is contemplated that the specified criteria of the relevant component part may be cataloged in the database and may be digitally and remotely accessible for retrieving the specified criteria of multiple relevant component parts stored in the database for use with the present concept. Thus, a user of the method 150 will identify and select a known component part from the database and the specified criteria of that component part can then be obtained from the database in the first step 152 of the method 150.

With reference to FIG. 8, a target component part 170 is shown in the form of a headrest assembly. The target component part 170 includes an outer casing 172 disposed over a cushioned structure 174. The outer casing 172 and cushioned structure 174 cooperate to define a headrest bun 175. The outer casing 172 may include leather, vinyl, and polymeric materials that are easily shaped to cover the cushioned structure 174. The target component part 170 further includes a closeout panel 176, which may be comprised of a polymeric material such as a thermoplastic material. A support member 178 includes first and second support posts 180, 182, which are contemplated to support the headrest bun 175 on a seat assembly. The support member 178 may be comprised of a rigid material such as a metal material. Thus, the target component part 170 includes a variety of materials which cooperate to provide specified performance criteria of the target component part 170. As such, the specified performance criteria of the target component part 170 includes a plurality of materials configured into a plurality of individual structures, wherein the structures may include items such as the outer casing 172, the cushioned structure 174, closeout panel 176, and support member 178.

Referring again to FIG. 7, a second step 154 of the present method 150 includes creating a design envelope using the specified criteria obtained in the first step 152. As used in relation to the method 150 of the present concept, the term "design envelope" refers to a physical boundary occupied by the target component part 170 in assembly. In this way, the design envelope provides a boundary limitation defined by the target component part 170. As such, the second step 154 of the method 150 provides a design envelope within which a formed trim article of the present concept must be contained. The resulting trim article may include multiple lattice layers that may emulate multiple structures disposed within a core portion the target component part selected in the first step 152 of the method 150. Specifically, with reference to FIG. 8, the target component part 170 includes an outer casing 172 that defines an interior portion 184 of the target component part 170. The cushioned structure 174 is shown disposed within the interior portion 184 of the target component part 170, as best shown in FIG. 9. Such foam structures can be simulated by forming tuned lattice matrices, such as first and second lattice matrices 128, 130 of trim article 100 described above with reference to FIGS. 5 and 6.

As further shown in FIG. 7, the method 150 includes a third step 156 in which the material for the desired trim article is selected. The material for the trim article may include any number of materials suitable for use in an additive manufacturing process, such as thermoplastic polyurethane. As noted above, the source material for the desired trim article being made using the method 150 of the present concept is contemplated to be a single material tuned to provide a simulated texture, feel, and overall experience of a target component part in a desired trim article comprised of a monolithic whole that is packaged to fit within the design envelope of the target component part.

As further shown in FIG. 7, the method 150 of the present concept includes a fourth step 158 in which individual lattice layers are tuned to meet the specified criteria of the target component part provided in the first step 152. In this way, cushioning and support materials of a target component part may be replicated using lattice matrices, such as first and second lattice matrices 128, 130 of trim article 100 described above with reference to FIGS. 5 and 6, designated within the design envelope of step 154. An aim of the present concept is to provide an overall feel, density profile and experience in the formed trim article that is familiar to a user relative to the target component part. For example, the lattice matrices may include first and second lattice matrices, such as those disclosed above with reference to the trim article 100 of FIGS. 5 and 6. In this example, lattice matrices 128, 130 may be provided to simulate the cushioned structure 174 for a headrest assembly of the target component part 170. A first portion 174A of the cushioned structure 174 is configured to be disposed adjacent a seat occupant's head. Therefore, this first portion 174A is contemplated to be softer and more flexibly resilient than a more supportive second portion 174B of the cushioned structure 174. The first portion 174A may be comprised of a flexibly resilient material, such as foam. The second portion 174B may also be comprised of a flexibly resilient foam material that is more structurally rigid as compared to the first portion 174A. Thus, at the fourth step 158 of the method 150, the individual lattice matrices are specifically tuned to meet the specified criteria of the target component part for effective simulation of the same.

Further, it is contemplated that multiple lattice matrices (beyond a dual matrix configuration) may be involved in the fourth step 158 of the method 150 to provide the overall configuration necessary to simulate a complex target component part comprised of varied materials. For instance, the target component part 170 shown in FIG. 9 includes a structural feature 186 operably coupled to the support member 178. The structural feature 186 may be a rigid feature that is emulated using a rigid structure provided from the source material that does not include a flexibly resilient lattice matrix. While such a structural feature may be provided in the formed trim article as a separate component, it is still fully integrated into the other components of the formed trim article given its production in an additive manufacturing process. The method 150 further includes the creation of a design for the desired trim article having one or more lattice matrices. With the tuning criteria provided at the fourth step 158 of the method 150, a desired trim article is formed at the final step 160 of the method 150. The cushioned structure 174 includes an overall density profile that must be replicated by the one or more lattice matrices configured into a core portion that is designed using the method 150 of the present concept. As such, the lattice matrices are tuned in the fourth step 158 of the method 150 to have an overall density profile correlated to the overall density profile of the cushioned structure 174. Such parameters as force deflection of the target component part 170 are emulated using the one or more lattice matrices of the desired trim article design.

In the final step 160 of the method 150, the desired trim article is formed using the material selected in the third step 156 of the method 150. As noted above, an additive manufacturing technique is used to build the desired trim article in an end to end, linear manner, such that a complete trim article is provided in a single manufacturing step using the method of the present concept. Further, it is contemplated that in the forming step 160 of the method 150, the individual parts of the formed trim article will be interconnected with one another to provide a monolithic whole in a manner as described above with reference to the individual parts of trim articles 34 and 100. For example, in forming the trim article 100 shown in FIGS. 5 and 6, the outer casing 102 would be interconnected with the first and second portions 118, 120 of the core portion 116. The outer casing 102 would also be interconnected with the upper and lower attachment features 122, 124 shown in FIG. 5. In this way, the method 150 of the present concept provides a monolithic part built using an additive manufacturing technique involving a single material that simulates a target component part selected by a user in the first step 152 of method 150.

The method 150 of the present disclosure may also include the following steps, which include making a trim article having features substantially similar to those disclosed above with reference to FIGS. 5 and 6. An outer casing, much like outer casing 102 shown in FIGS. 5 and 6, may be printed using an additive manufacturing technique to include an interior portion defined therein. A core portion, such as the core portion 116 shown in FIGS. 5 and 6, can be printed within the interior portion of the outer casing. The core portion may include a first lattice matrix with a first pattern of interconnected links defining a first set of cells similar to the first lattice matrix 128 illustrated in FIGS. 5 and 6. A second lattice matrix may be printed having a second pattern of interconnected links that define a second set of cells, as similarly illustrated in FIGS. 5 and 6 as second lattice matrix 130. The second lattice matrix may include an overall density profile that is greater than an overall density profile of the first lattice matrix. The outer casing may be printed simultaneously with the first lattice matrix, such that the outer casing includes an inner surface interconnected with a first side of the first lattice matrix in an end-to-end additive manufacturing procedure. Additionally, the first and second lattice matrices may be printed simultaneously, such that a second side of the first lattice matrix may be interconnected with a first side of the second lattice matrix, as illustrated in FIGS. 5 and 6. The outer casing may be printed simultaneously with the second lattice matrix, such that the inner surface of the outer casing is interconnected with a second side of the second lattice matrix. At least one attachment feature may be printed as outwardly extending from an exterior surface of the outer casing, much like attachment features 122, 124, 122A, 122B shown in FIGS. 5 and 6, for providing an interconnected mounting feature to the trim article.

The method 150 may also include the following steps including features substantially similar to those described above in reference to FIGS. 5 and 6. Specified criteria of a target component part comprised of a plurality of materials may be obtained. Such a target component part may include structures and materials indicated above with reference to the target component part 170 of FIGS. 8 and 9. The specified criteria may be processed into a design envelope for making the trim article. The design envelope may include parameters for the trim article to be created from a single material. By way of example, not limitation, the single material may be a thermoplastic polyurethane. The design envelope may be input into a three-dimensional printing device supplied with the single material for additive manufacturing. The trim article may be formed using a three-dimensional printing device from the single material. An outer casing, similar to the outer casing 102 illustrated in FIGS. 5 and 6, is formed with first and second sides spaced apart from one another to define an interior portion therebetween. In addition, a plurality of through apertures are formed along the first side of the outer casing and open into the interior portion of the outer casing. A core portion may be formed and disposed within the interior portion. The core portion may include first and second lattice matrices interconnected with one another and the outer casing similar to the first and second lattice matrices 128, 130 depicted in FIGS. 5 and 6. The first and second lattice matrices may include first and second density profiles which may cooperate to define an overall density profile of the core portion. Additionally, the first and second density profiles of the first and second lattice matrices may be variated from one another.

According to one aspect of the present invention, a trim article includes an outer casing having a first side and a second side with an interior portion disposed therebetween. A first lattice matrix is disposed within the interior portion of the outer casing and includes a first pattern of interconnected links defining a first set of cells of the first lattice matrix. A second lattice matrix is disposed within the interior portion of the outer casing and includes a first pattern of interconnected links defining a first set of cells of the second lattice matrix. The second lattice matrix includes an overall density profile that is greater than an overall density profile of the first lattice matrix.

Embodiments of the first aspect of the invention can include any one or a combination of the following features:
  the first lattice matrix further includes a second pattern of interconnected links defining a second set of cells of the first lattice matrix;
  the first pattern of interconnected links of the first lattice matrix includes a density profile that is less than a density profile of the second pattern of interconnected links, wherein the density profile of the first pattern of interconnected links and the density profile of the second pattern of interconnected links cooperate to define the overall density profile of the first lattice matrix;
  the first set of cells of the first lattice matrix includes cells comprised of a first size, and the second set of cells includes cells comprised of a second size, wherein the first size is greater than the second size; and the interconnected links of the first pattern of the first lattice matrix include a thickness that is less than a thickness of the interconnected links of the first pattern of the second lattice matrix.

the second lattice matrix further includes a second pattern of interconnected links defining a second set of cells of the second lattice matrix;

the first pattern of interconnected links of the second lattice matrix includes a density profile that is less than a density profile of the second pattern of interconnected links of the second lattice matrix, wherein the density profile of the first and second patterns of interconnected links of the second lattice matrix cooperate to define the overall density profile of the second lattice matrix;

the first set of cells of the second lattice matrix includes cells comprised of a first size, and the second set of cells of the second lattice matrix includes cells comprised of a second size, wherein the first size is greater than the second size; and the first and second lattice matrices each include second patterns of interconnected links defining second sets of respective cells, wherein the first pattern of interconnected links of the first lattice matrix includes a density profile that is less than a density profile of the second pattern of interconnected links of the first lattice matrix, and further wherein the first pattern of interconnected links of the second lattice matrix includes a density profile that is less than a density profile of the second pattern of interconnected links of the second lattice matrix.

According to another aspect of the present invention, a trim article includes a first lattice matrix including first and second sides. The first lattice matrix includes a first pattern of interconnected links defining a plurality of cells. A second lattice matrix includes first and second sides and further includes a second pattern of interconnected links defining a plurality of cells. The first side of the second lattice matrix is operably coupled to the second side of the first lattice matrix. The first lattice matrix includes an overall density profile that is less than an overall density profile of the second lattice matrix.

Embodiments of the second aspect of the invention can include any one or a combination of the following features:

an outer casing having first and second sides spaced-apart from one another to define an interior portion disposed therebetween, wherein the first and second lattice matrices are positioned within the interior portion of the outer casing;

the first side of the first lattice matrix is operably coupled to an inner surface of the first side of the outer casing, and further wherein the second side of the second lattice matrix is operably coupled to an inner surface of the second side of the outer casing;

at least one attachment feature outwardly extending from an outer surface of the second side of the outer casing;

the outer casing, the first lattice matrix, the second lattice matrix, and the at least one attachment feature are all comprised of a common material to define a monolithic structure;

the first side of the outer casing includes a thickness that is less than a thickness of the second side.

According to yet another aspect of the present invention, a trim article includes an outer casing having an inner surface defining an interior portion of the outer casing. The outer casing further includes a front surface having a plurality of through apertures disposed thereon. A core portion is disposed within the interior portion of the outer casing.

The core portion includes first and second portions having variated densities relative to one another. The outer casing and the core portion are integrated to define a monolithic structure comprised of a common material.

Embodiments of the third aspect of the invention can include any one or a combination of the following features:

the first portion of the core portion includes a first lattice matrix having a plurality of interconnected links disposed in a first pattern to define a first set of cells;

the second portion of the core portion includes a second lattice matrix having a plurality of interconnected links disposed in a second pattern to define a second set of cells, wherein the second portion of the core portion includes a density profile that is greater than a density profile of the first portion of the core portion;

the interconnected links of the first lattice matrix include a thickness that is less than a thickness of the interconnected links of the second lattice matrix; and the first lattice matrix is disposed on an outer surface of the second lattice matrix.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A trim article, comprising:
an outer casing having a first side and a second side defining an interior portion disposed therebetween, wherein the outer casing is a continuous outer casing surrounding the interior portion;
a first lattice matrix disposed within the interior portion of the outer casing and having a first pattern of interconnected links defining a first set of cells of the first lattice matrix; and
a second lattice matrix disposed within the interior portion of the outer casing and having a first pattern of interconnected links defining a first set of cells of the second lattice matrix, wherein the second lattice matrix includes an overall density profile that is greater than an overall density profile of the first lattice matrix, and further wherein the first side, the second side, the first lattice matrix and the second lattice matrix are all comprised of a common material to define a monolithic structure.

2. The trim article of claim 1, wherein the first lattice matrix further includes a second pattern of interconnected links defining a second set of cells of the first lattice matrix.

3. The trim article of claim 2, wherein the first pattern of interconnected links of the first lattice matrix includes a density profile that is less than a density profile of the second pattern of interconnected links, wherein the density profile of the first pattern of interconnected links and the density profile of the second pattern of interconnected links cooperate to define the overall density profile of the first lattice matrix.

4. The trim article of claim 3, wherein the first set of cells of the first lattice matrix includes cells comprised of a first size, and the second set of cells includes cells comprised of a second size, wherein the first size is greater than the second size.

5. The trim article of claim 1, wherein the interconnected links of the first pattern of the first lattice matrix include a thickness that is less than a thickness of the interconnected links of the first pattern of the second lattice matrix.

6. The trim article of claim 1, wherein the second lattice matrix further includes a second pattern of interconnected links defining a second set of cells of the second lattice matrix.

7. The trim article of claim 6, wherein the first pattern of interconnected links of the second lattice matrix includes a density profile that is less than a density profile of the second pattern of interconnected links of the second lattice matrix, wherein the density profile of the first and second patterns of interconnected links of the second lattice matrix cooperate to define the overall density profile of the second lattice matrix.

8. The trim article of claim 7, wherein the first set of cells of the second lattice matrix includes cells comprised of a first size, and the second set of cells of the second lattice matrix includes cells comprised of a second size, wherein the first size is greater than the second size.

9. The trim article of claim 1, wherein the first and second lattice matrices each include second patterns of interconnected links defining second sets of respective cells, wherein the first pattern of interconnected links of the first lattice matrix includes a density profile that is less than a density profile of the second pattern of interconnected links of the first lattice matrix, and further wherein the first pattern of interconnected links of the second lattice matrix includes a density profile that is less than a density profile of the second pattern of interconnected links of the second lattice matrix.

10. A trim article, comprising:
a first lattice matrix having first and second sides, wherein the first lattice matrix includes a first pattern of interconnected links defining a plurality of cells;
a second lattice matrix having first and second sides, wherein the second lattice matrix includes a second pattern of interconnected links defining a plurality of cells, wherein the first side of the second lattice matrix is operably coupled to the second side of the first lattice matrix, and further wherein the first lattice matrix includes an overall density profile that is less than an overall density profile of the second lattice matrix; and
an outer casing having a first and a second side, wherein the first side of the outer casing includes a thickness that is less than a thickness of the second side, and further wherein the outer casing surrounds both the first lattice matrix and the second lattice matrix in a continuous manner.

11. The trim article of claim 10, wherein the first and second sides of the outer casing are spaced-apart from one another to define an interior portion disposed therebetween, wherein the first and second lattice matrices are positioned within the interior portion of the outer casing.

12. The trim article of claim 11, wherein the first side of the first lattice matrix is operably coupled to an inner surface of the first side of the outer casing, and further wherein the second side of the second lattice matrix is operably coupled to an inner surface of the second side of the outer casing.

13. The trim article of claim 12, including:
at least one attachment feature outwardly extending from an outer surface of the second side of the outer casing.

14. The trim article of claim 13, wherein the outer casing, the first lattice matrix, the second lattice matrix, and the at least one attachment feature are all comprised of a common material to define a monolithic structure.

15. The trim article of claim 11, wherein the first side of the outer casing includes a thickness that is less than a thickness of the second side.

16. A trim article, comprising:
an outer casing having an inner surface, wherein the outer casing is a continuous outer casing, such that the inner surface thereof surrounds an interior portion defined by the outer casing, wherein the outer casing further includes a front surface having a plurality of through apertures disposed thereon; and
a core portion disposed within the interior portion of the outer casing, wherein the core portion includes first and second portions having variated densities relative to one another, wherein the outer casing and the core portion are integrated to define a monolithic structure comprised of a common material.

17. The trim article of claim 16, wherein the first portion of the core portion includes a first lattice matrix having a plurality of interconnected links disposed in a first pattern to define a first set of cells.

18. The trim article of claim 17, wherein the second portion of the core portion includes a second lattice matrix having a plurality of interconnected links disposed in a second pattern to define a second set of cells, wherein the second portion of the core portion includes a density profile that is greater than a density profile of the first portion of the core portion.

19. The trim article of claim 18, wherein the interconnected links of the first lattice matrix include a thickness that is less than a thickness of the interconnected links of the second lattice matrix.

20. The trim article of claim 18, wherein the first lattice matrix is disposed on an outer surface of the second lattice matrix.

* * * * *